UNITED STATES PATENT OFFICE.

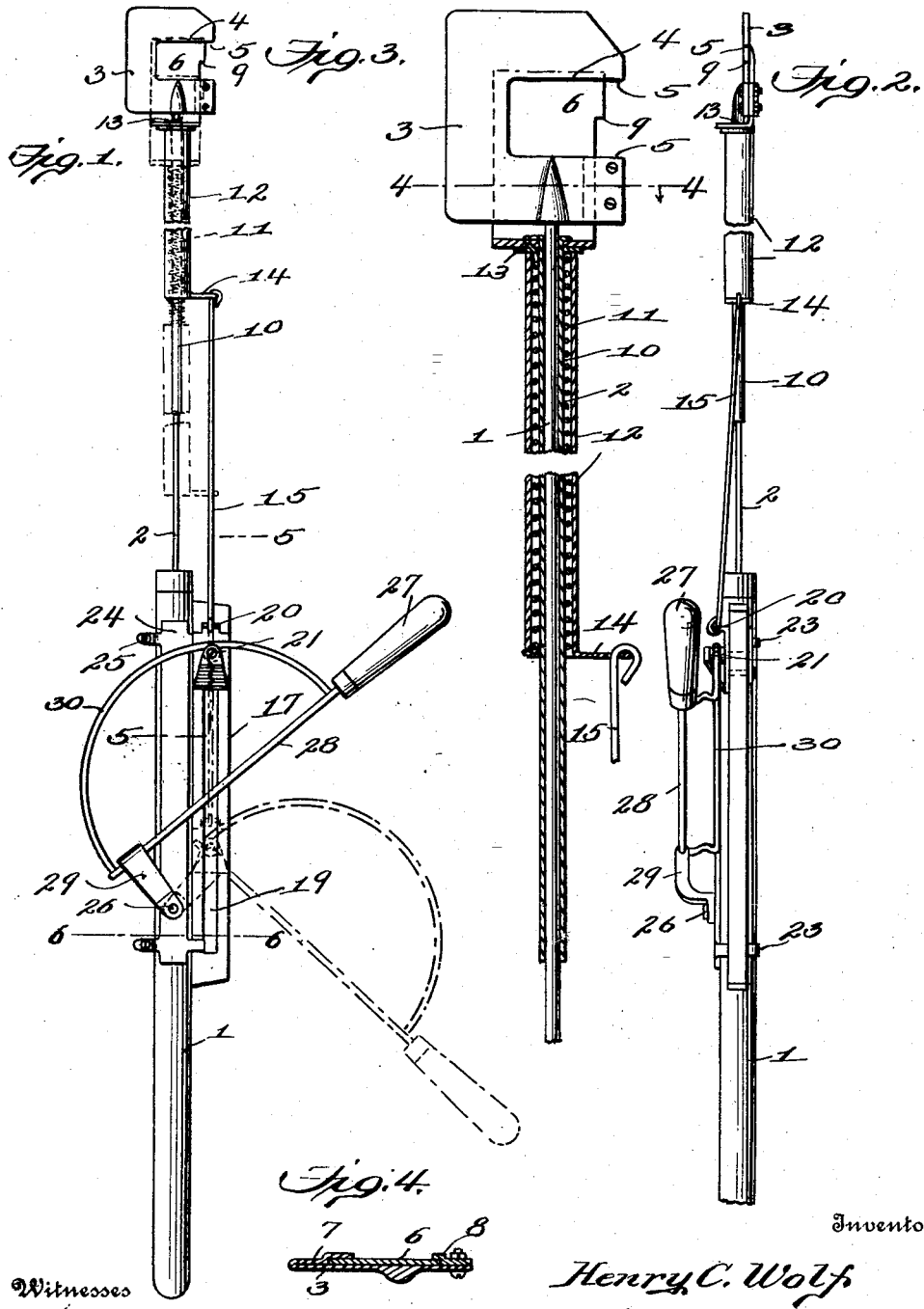

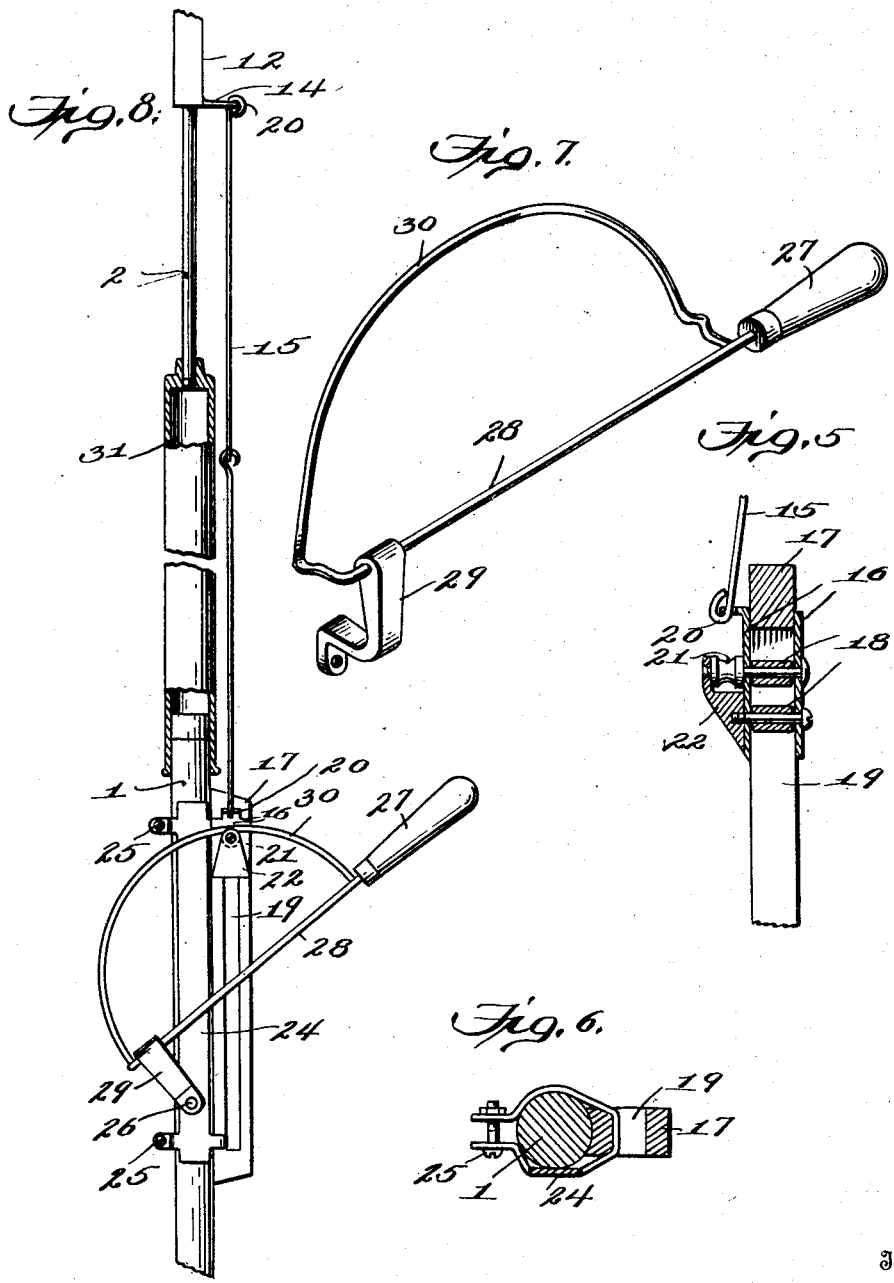

HENRY C. WOLF, OF CATAWISSA, PENNSYLVANIA.

TREE-TRIMMER.

1,190,059. Specification of Letters Patent. Patented July 4, 1916.

Application filed October 17, 1914. Serial No. 867,177.

*To all whom it may concern:*

Be it known that I, HENRY C. WOLF, a citizen of the United States, residing at Catawissa, in the county of Columbia and State of Pennsylvania, have invented new and useful Improvements in Tree-Trimmers, of which the following is a specification.

My present invention relates to tree trimmers, and the primary object is to provide an improved implement of this character which will be capable of severing the small limbs and branches of trees with certainty and facility and requiring comparatively little effort on the part of the operator, it having a movable blade and a spring-actuated member which is set and automatically released to operate the movable knife, the severing action of the knife being effected by a quick hammer blow delivered to the knife by the spring-actuated member.

Another object of the invention is to provide means whereby the actuating handle of the implement can be readily adjusted to suit the different heights of the trees and operators.

To these and other ends, the invention consists in certain improvements, and combinations and arrangements of parts, all as will be hereinafter more fully described, the novel features being pointed out particularly in the claims at the end of the specification.

In the accompanying drawings:—Figure 1 is an elevation of a tree trimmer constructed in accordance with the present invention, the full and dotted lines showing the knife in two different positions; Fig. 2 is a view of the implement in elevation and as it appears from the right in Fig. 1; Fig. 3 is a detail view, partly in section, showing the knives and the actuating member and its spring; Fig. 4 represents a section on the line 4—4 of Fig. 3; Fig. 5 represents a section on the line 5—5 of Fig. 1; Fig. 6 represents a section on the line 6—6 of Fig. 1; Fig. 7 is a perspective view of the knife-operating handle; Fig. 8 is a detail view, partly in section, showing a modified construction embodying an extension sleeve.

Similar parts are designated by the same reference characters in the several views.

The present invention provides an implement which is especially adapted for trimming or severing the small limbs or branches of trees and the like, and the preferred construction is shown in the accompanying drawings and will be hereinafter described in detail. It will be understood, however, that the invention is not restricted to the precise construction shown, as equivalent constructions within the scope of the claims at the end of the specification are contemplated and will be included as within the scope of the invention.

In the present instance, 1 designates the supporting handle of the implement, it being preferably constructed of a rod of wood or other material and is adapted to be gripped at its lower end by one hand of the operator. In the construction shown in Figs. 1 and 2, a rod 2 has its lower end fixed in the upper end of the handle 1 and the upper end of the rod is attached to a fixed knife 3. This fixed knife in the construction shown has a blade 4 at the top and an opening 5 to admit the branch or limb which is to be severed. The fixed knife also provides means for guiding a movable knife 6, the fixed knife 3 in the present instance having a doubled portion 7 which guides one edge of the movable knife and it has a guide 8 attached thereto and arranged to vertically guide the opposite edge of the movable knife 6. The movable knife is also provided with a stop which limits its opening movement. In the construction shown, one edge of the movable knife is cut to form a shoulder 9 which is arranged to abut against the upper end of the guide 8 when the knife 6 reaches open position. The rod 2 is surrounded in the present instance by a tube 10 which is fastened at its upper end to the knife 6 and adapted to slide longitudinally on said rod and thereby assist in guiding the knife, and the tube 10 in turn is surrounded by a coiled spring 11 which latter is guided and held in proper shape by the tube 10. The coiled spring is surrounded in turn by a sleeve 12. The upper end of the spring 11 is attached at 13 to the movable knife 6 and at its lower end to the sleeve 12 and said sleeve is provided with an outwardly projecting arm 14 to which an actuating rod 15 is connected. The actuating rod 15 is connected at its lower end to a cross-head or slide which, in the construction shown, embodies a pair of plates 16 which are movable vertically at opposite sides of a guiding block 17, and a pair of rollers 18 are interposed between the plates 16 and operate in a slot 19 which extends vertically in the block 17. The rod 15 is connected to the plates 16 of the cross-head or slide at 20, and the cross-head or slide carries a roller 21 which is preferably grooved, as shown, and is provided at its under side with an inclined guard 22, the purpose of which will hereinafter appear. The slotted guide block 17 is attached to the handle by clips 23 which are formed on or attached to a plate 24 which is adapted to lie against one side of the handle 1; the clips extend through the slot 19 in the guide block 17, and they are clamped to the handle 1 to position the guide block 17 at the proper point in the length of the handle 1 by clamp screws 25.

The plate 24 provides a pivot or fulcrum 26 for an operating handle, this operating handle embodying a hand grip 27, a rod 28 fixed thereto and provided with an arm 29 which is adapted to rock on the pivot 26, and a curved rail 30 which is located eccentrically of the pivot 26 and during the downward movement of the grip 27 rides upon the roller 21 and thereby draws the cross-head or slide downwardly, causing corresponding downward movement of the rod 15 and the sleeve 12, thereby tensioning the spring 11 and drawing the movable knife blade 6 into open position where it is arrested by the shoulder 9. When the end of the rail 30 reaches the roller 21, the track will ride off the roller and the spring 11 will then force the sleeve 12 upwardly with a quick motion, causing the upper end of the sleeve to strike against the lower end of the movable knife 6 and thereby produce a hammer blow or impact which will force the blade 6 toward the blade 4 with great power which will be sufficient to sever the limb. When the grip 27 is returned to its upper position, the track 7 will be deflected past the roller 21 by the bevel 22, whereupon the track will reëngage the roller 21 preparatory to the next operating stroke. It will be observed from Fig. 7 that the rail 30 is offset laterally with relation to the rod 28 of the operating handle whereby it will be permitted to pass freely off the roller 21 when the end of the rail is reached. The eccentric relation between the track 30 and the pivot 26 is obtained by connecting the rod 28 to the pivot by the arm 29 which latter is located eccentrically of the rail 30. It will be understood that when the rod 15 is drawn downwardly to tension the spring 11, the upper end of the sleeve 12 will assume a position considerably below the lower end of the movable knife 6.

In the construction shown in Fig. 8, the rod 2 is attached to a sleeve 31, the lower end of the sleeve having a telescopic fit upon the upper end of the handle 1 whereby the length of the implement can be adjusted to suit the height of the person using the same, and the clamps 23 also provide for the vertical adjustment of the operating handle and the guiding block 17 along the length of the handle 1.

I claim as my invention:—

1. In a tree trimmer comprising relatively movable knives, knife-actuating means embodying a spring operative when tensioned to retract one of said knives, and a member actuated by said spring and operative to produce an impact blow upon one of said knives.

2. In a tree trimmer comprising relatively movable knives, knife-actuating means embodying a spring connected to one of the knives to retract it and a hammer member connected to and actuated by said spring to produce an impact upon one of said knives.

3. In a tree trimmer comprising relatively movable knives, knife-actuating means embodying, in combination, a spring connected to one of said knives to retract it, a member connected to and actuated by said spring and operative to produce an impact blow upon one of said knives, and means for retracting said member and releasing the same.

4. In a tree trimmer comprising relatively movable knives, knife-actuating means embodying, in combination, a spring operative to retract one of the knives, a member actuated by said spring and operative to produce an impact blow upon one of said knives, and means for retracting said member and releasing the same, comprising a slide connected to said member, and a pivoted handle having an eccentric track coöperative with said slide to retract and release the same.

5. In a tree trimmer comprising a fixed and a movable knife, the combination of a rod supporting the fixed knife, a spring surrounding said rod and connected to the movable knife, a sleeve surrounding the spring and connected thereto, and means for retracting said sleeve to disengage it from the movable knife and to tension the spring and retract the knife to which it is connected and for releasing the sleeve to cause the latter to produce an impact upon the movable knife.

6. In a tree trimmer comprising relatively movable knives, knife-actuating means embodying, in combination, a spring, a member actuated thereby and operative to produce an impact blow upon one of said knives, and means for retracting said member and releasing the same, comprising a slide connected to said member, a pivoted handle having an eccentric track coöperative with said slide to retract and release the same, a relatively fixed supporting handle, a guide for said slide, and means for clamping said guide and the pivoted handle in different adjusted positions along the length of the fixed handle.

7. In a tree trimmer comprising relatively movable knives, knife-actuating means embodying, in combination, a spring, a member actuated thereby and operative to produce an impact blow upon one of said knives, means for retracting said member and releasing the same, a relatively fixed supporting handle, a sleeve longitudinally adjustable on said fixed handle and carrying the knives, and means for securing said retracting means at different points along the length of the fixed handle.

In testimony whereof I have hereunto set my hand in presence of two subscribing witnesses.

HENRY C. WOLF.

Witnesses:
E. B. LUIE,
C. E. KREISHEE.

Copies of this patent may be obtained for five cents each, by addressing the "Commissioner of Patents, Washington, D. C."